Oct. 2, 1951  G. A. MITCHELL  2,569,487
INTERMITTENT MOVEMENT WITH IMPROVED CLAW ACTION
Filed June 13, 1949  3 Sheets-Sheet 3

Inventor
George A. Mitchell
Barkdew & Scaudle bury
Attys

Patented Oct. 2, 1951

2,569,487

UNITED STATES PATENT OFFICE 2,569,487

INTERMITTENT MOVEMENT WITH IMPROVED CLAW ACTION

George A. Mitchell, Pasadena, Calif., assignor to Mitchell Camera Corporation, Glendale, Calif., a corporation of Delaware Application June 13, 1949, Serial No. 98,648

7 Claims. (Cl. 88—18.4)

This invention is concerned with improvements in intermittent film movements of the claw type, such as are used in motion picture apparatus of various kinds.

The invention has to do, more particularly, with improvements in such movements which result in an improved pattern of motion of the film engaging claw, whereby its engagement with and disengagement from the film is more positive and smooth, with virtual or complete elimination of sawing action of the claw across the film as contact is made and broken.

It is well understood that the motion of the film advancing claw during the pull-down stroke should follow reasonably closely the shape of the film guide, so that the claw surface which drivingly engages the film edge (ordinarily a side edge of a film perforation) will have a minimum transverse motion relative to the film.

The present application is concerned more particularly with the pattern of claw motion at the very start and at the very end of the film advancing stroke. At the end of that stroke, the film is brought to rest, ordinarily by the friction of suitable pressure shoes, at a point which is accurately defined by the position at which the claw ends its stroke. An important object of the present invention is to provide simple and effective means for disengaging the claw from the film perforations, after the film has thus come to rest, with a minimum of sawing action, both to avoid displacing the film from its correct position and to avoid unnecessary wear of both the claw and the film.

In a preferred form of the invention, the claw is brought to rest at the end of the film advancing stroke and then is positively and smoothly moved back in the reverse direction out of contact with the edge of the film perforation. Only after contact with the film has thus been broken is the action of withdrawing the claw from the perforation initiated. The resulting motion pattern has the advantage of minimizing wear on the film and claw. It has the further advantage that even if the claw should become so worn as to form a groove at the point of film contact, that groove cannot catch on the film and tear or displace it as the claw is withdrawn. Instead, the reverse longitudinal motion of the claw after completion of the pull-down stroke completely frees the film from any such groove before the claw is withdrawn.

A further object of the invention is to provide improved claw action as the claw engages the film at the start of a film advancing stroke. That is accomplished in one modification of the invention by moving the claw into film engagement in such a manner that the meshing stroke carries the claw into full alinement with the film, but spaced from the film perforation edge, and then reducing or entirely eliminating that spacing by relatively slow claw motion parallel to the film before the start of the pull-down stroke itself.

The invention pertains to cam driven claw movements of many different types. In such movements it is usual for the film advancing motion of the claw to be positively controlled by a pull-down cam which has an eccentric stroke-producing cam surface lying between two circular concentric dwell surfaces. A cam follower connected to the claw engages the eccentric cam surface to produce the claw stroke, and engages the respective dwell surfaces immediately before and after that stroke while the claw is being brought (by other means) into and out of film engagement. For the purposes of the present invention it is largely immaterial what mechanism is provided for moving the claw into and out of film engagement during the dwell periods of the pull-down cam.

The present improvement in such claw mechanisms replaces the described concentric dwell surfaces of the pull-down cam by circular eccentric surfaces which move the claw longitudinally of the film at a speed relatively slow compared to the speed of the pull-down stroke itself. The dwell periods of previous pull-down cams, during which the claw enters and leaves the film perforations, are thus replaced by stroke periods. The resulting claw strokes are directed longitudinally of the film, like the pull-down stroke, but are of relatively small amplitude. The small longitudinal stroke which thus follows the pull-down stroke is preferably directed oppositely to the latter; the corresponding small stroke which precedes the pull-down stroke may be arranged to act in either direction, as requirements dictate, or may be made substantially zero.

When the meshing action of the movement, by which the claw is moved transversely of the film into and out of the film perforations, is such that intervals of claw dwell would otherwise occur between the longitudinal pull-down stroke and the transverse meshing and unmeshing strokes, the small longitudinal strokes of the present invention perferably occur, at least in part, during those periods of relative dwell. When the meshing and unmeshing strokes are not so separated in time from the pull-down stroke, the longitudinal strokes of the invention may be superposed upon them.

An important characteristic of the present invention is its manner of obtaining the cam form described above, and hence of obtaining the desired claw pattern, which is, namely, to employ a cam of the usual form, and to set such a cam on the shaft with the cam axis eccentric to the shaft axis by a predetermined amount and in a predetermined azimuth. That preferred structure in accordance with the invention is particularly advantageous when the cam works between two parallel cam follower surfaces and must therefore have the same effective diameter in all azimuths. Such a constant width or constant diameter cam provides positive control of the claw position. Any modification of one cam surface of a constant diameter cam must be accompanied by a precisely corresponding, oppositely directed modification of the opposite cam surface, in order to maintain the constant diameter characteristic of the cam. The invention avoids any difficulty in producing such a compensating surface, since the overall cam form is not necessarily altered. The convenient property of constant diameter cams as ordinarily used, that all cam surfaces are circular, is also retained. It will be seen from the following description that the eccentric mounting of a constant diameter cam can be employed to yield a great variety of cam controlled movements, which have general utility.

In spite of the very simple and economical manner in which the invention is thus preferably carried out, the respective modifications produced in the claw pattern at the start and at the end of the pull-down stroke can be varied largely independently of each other. This is accomplished, as will be described, by suitable selection of the azimuth of the eccentricity of the pull-down cam on its shaft.

The present invention in its preferred aspect can be embodied in substantially any claw movement which includes a pull-down cam having dwell periods, the meshing action usually taking place during those dwell periods. It is immaterial what mechanism is employed to produce the meshing action. That may be accomplished by another cam, as in the preferred form of movement here illustratively described; or the same cam which produces the pull-down stroke may also control the meshing action. In the latter instance, in which a single boxed cam is typically used, the eccentricity introduced in accordance with the invention will affect also the meshing action, but that effect in general is relatively small and can be compensated if necessary, for example by appropriate shaping of the film guide. Meshing action may be accomplished by suitable structure of the claw itself, which may be arranged to produce a ratchet action upon reversal of the claw direction. If two cams are used, they need not be on the same shaft, nor on the same axis. The pull-down cam and the meshing cam may have different periods of rotation, as in the well-known "skip" movements. The claw carrier can be pivoted for oscillatory motion, or it can be mounted for reciprocation only, without any oscillation, either in two dimensions or, if a ratchet claw or its equivalent is used, in only one dimension. Movements of all those types are well known in the art, and it will be apparent from the following description that by setting the pull-down cam of any such movement eccentric with respect to its axis of rotation the objectives of the invention can be accomplished, regardless of such differences in type of movement as have been indicated.

A clear understanding of the invention and of its various objects and advantages will be had from the following detailed description of its embodiment in a typical cam actuated claw movement. For clarity of description reference is made to a particular form of movement, but it will be apparent that the invention can be embodied also, as indicated above, in substantially any form of cam actuated claw movement employing a pull-down cam of suitable form. Reference is made to the accompanying drawings, which form a part of the description and in which:

Figures 1, 2, 3, 4, 5, 6, 6A, 9:
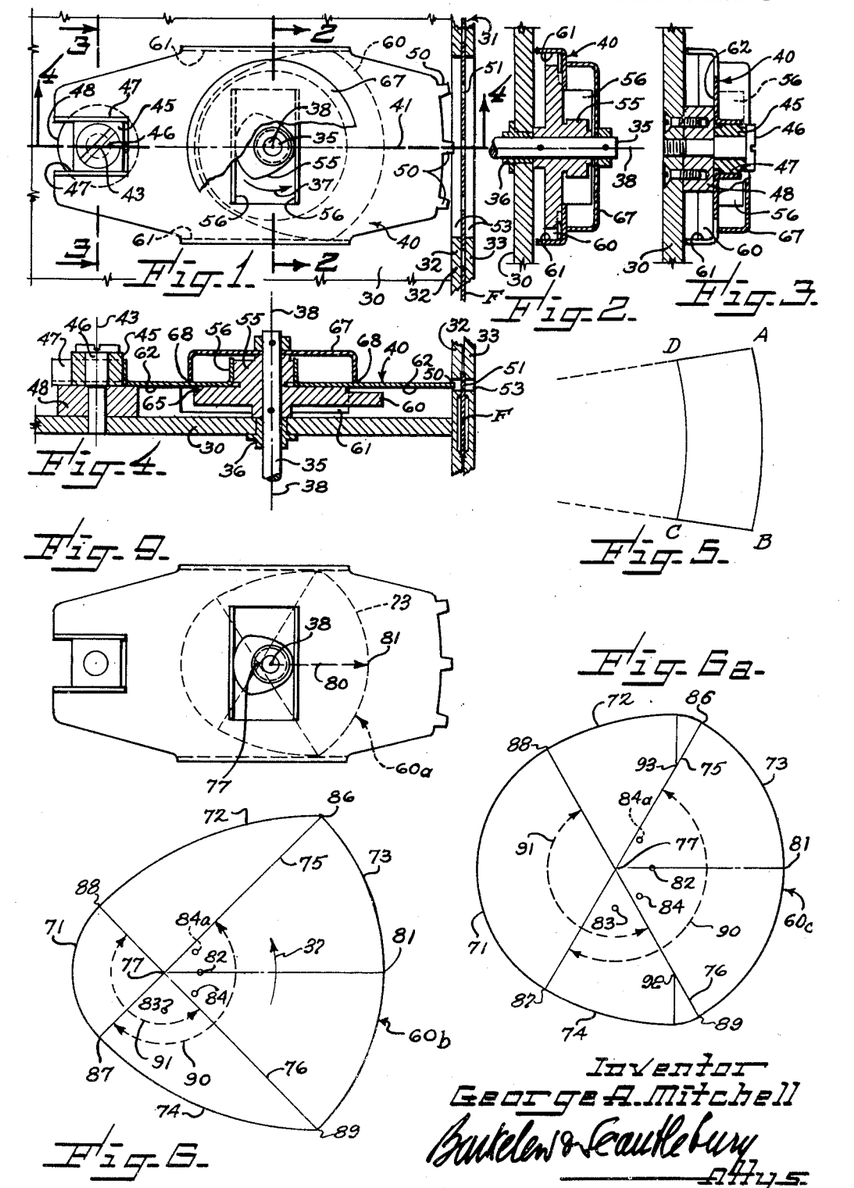
Fig. 1 is a side elevation of a typical movement in which the invention may be embodied, the cam dwell angles being shown typically at approximately 120°.
Figs. 2 and 3 are vertical sections on lines 2—2 and 3—3, respectively, of Fig. 1.
Fig. 4 is a horizontal section on line 4—4 of Fig. 1.
Fig. 5 is a schematic diagram of the usual claw pattern of the movement of Figs. 1-4.
Figs. 6 and 6a are diagrams of typical constant diameter cams, having dwell angles of approximately 90° and 120°, respectively.
Fig. 9 is a fragmentary elevation corresponding to Fig. 1 and showing a typical embodiment of the invention in the movement of Figs. 1-4.

Figs. 1-4 show a typical illustrative form of movement of the general type in which the present invention may be embodied. The mechanism itself and its more important characteristics will be described first apart from the present improvement. The numeral 30 designates a portion of the rigid frame of a motion picture machine, which may be, for example, a camera, printer or a projector. A film guideway 31 is defined by film guide plates 32 and 33 which may be considered to be rigidly mounted on frame 30. A driving shaft 35 is journaled on frame 30, as by a bushing 36, for rotation about shaft axis 38, and carries cam means to be described. Shaft 35 is rotatable by power means not shown, and turns normally in the direction of the arrow 37 (Fig. 1).

The claw arm 40 as here typically illustrated is symmetrical about its longitudinal axis 41. At its inner end it is slidingly pivoted to frame 30 on fixed pivot stud 46 for oscillation about pivot axis 43, which is parallel to shaft 35, and for reciprocation with respect to the pivot stud. The reciprocating motion of the claw arm is guided by pivot slide 47, which engages a pivot block 45 rotatably mounted on stud 46. It is broadly immaterial whether pivot axis 43 is fixed with relation to the frame, as in the preferred modification illustrated, or whether it is fixed with relation to the claw arm and slidingly related to the frame.

The outer end of claw arm 40 carries one or more claws 50, adapted to engage perforations 51 of a film F in film guideway 31. Claws 50 have access to the film through slots 53 in film guide plates 32 and 33. As may be seen at once from the drawings, motion of the claws transversely into and out of film engagement involves primarily longitudinal reciprocatory motion of claw arm 40, while claw motion longitudinally of film F, by which the film is advanced, involves primarily oscillatory motion of the claw arm about pivot axis 43.

The longitudinal reciprocatory motion of the claw arm is driven from shaft 35 by meshing cam 55, which engages opposed transverse follower surfaces 56, parallel to each other and normal to claw arm axis 41. The oscillatory motion of the claw arm is similarly driven from shaft 35 by pull-down cam 60, which engages a pair of opposed longitudinal follower surfaces 61, parallel to each other and to claw arm axis 41. The position of the claw arm is thus completely and positively defined in the plane of its motion, which is normal to pivot axis 43 and to shaft 35, by the relative rotational position of the two cams 55 and 60 with respect to their respective follower surfaces 56 and 61. (Regarding other types of movement, including those employing only one cam, see below.) The claw arm is confined to its motion plane as by sliding contact of its inner face 62 with the outer face of cam 60 (or of a boss 65 formed on that face) and with the outer face of fixed spacer block 48, and by sliding contact of its outer face with the edge 68 of cupped washer 67, mounted on shaft 35 outwardly of cam 55 and enclosing that cam and its follower surfaces 56.

Both of cams 55 and 60, as illustrated, and as preferably but not necessarily used in connection with the present invention, are of the well known type the periphery of which includes two concentric dwell surfaces alternating with two circular but eccentric throw surfaces, the dwell surfaces each extending through an angle of 90° or more about the cam axis. In the drawings the angular extent of the dwell surfaces of both cams, herein called the dwell angle, is typically shown as about 110°.

With cams of that type, having dwell angles of 90° or more, the follower surfaces (56 or 61) are engaged alternately by dwell surfaces and by throw surfaces of the cam, producing alternate dwell and throw periods in both components of the resulting claw arm motion.

For convenience in describing the invention and its setting the following terminology is useful in connection with constant diameter cams of the general type shown in Fig. 6. The cam periphery has four distinct portions, which are, in the order in which they pass a relatively fixed point as the cam rotates, the inner dwell surface 71, the outward throw surface 72, the outer dwell surface 73 and the inward throw surface 74. The surfaces are described in accordance with the numerals used in Fig. 6 on the basis of counterclockwise rotation, as indicated by the arrow 37. If the direction of rotation is reversed, the two throw surfaces 72 and 74 exchange functions, surface 72 becoming the inward throw surface and 74 the outward throw surface. Inner and outer dwell surfaces 71 and 73 retain their identity regardless of the direction of cam rotation. They are concentric about the cam axis or center 77.

The two throw surfaces 72 and 74 are also circular in form. Each is centered at the intersection of the other with outer dwell surface 73. Diameters 75 and 76 drawn from those points through cam axis 77 provide a convenient indication of the division between inner dwell surface 71 and the adjacent throw surfaces 72 and 74. The angles subtended at cam axis 77 by the dwell and throw surfaces are called the dwell and throw angles, respectively. The cams which are most useful in connection with the present invention ordinarily have a dwell angle of 90° or more.

The azimuth angles at which the two cams 55 and 60 are fixed on shaft 35 are preferably so related to their respective sets of follower surfaces, that at least one cam is always in a dwell period, the throw periods of the two cams alternating and not overlapping. That condition leads to a claw pattern of the general type shown schematically in Fig. 5, in which there are four distinct claw strokes. Film advancing stroke AB and return stroke CD are each produced by a throw of pull-down cam 60 only, cam 55 being in a dwell period; and meshing strokes DA and BC are produced by throws of meshing cam 55 only, pull-down cam 60 being in a dwell period. Sharp corners are formed at A, B, C and D between adjacent strokes whenever the dwell angles of the two cams average at least 90° (and the cam azimuth angles are suitably chosen). When the average dwell angle exceeds 90°, the appearance of the pattern remains the same, but the claw itself has a dwell period at each corner (or at certain corners), during which it remains stationary at the corner of the pattern after completing one stroke and before beginning the following stroke.

Figure 7:
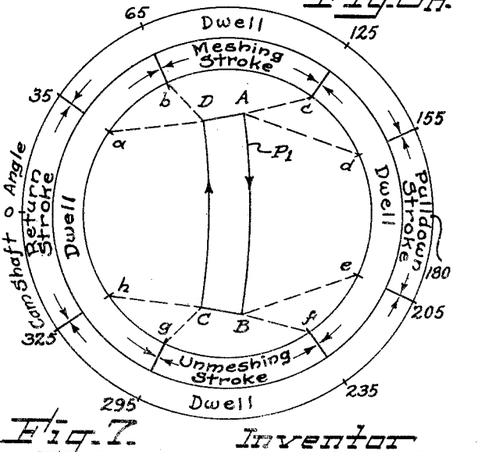
Fig. 7 is a schematic diagram illustrating the time relations involved in the claw pattern of a movement similar to Figs. 1-4, but in which both cams have dwell periods of 120°.
Figure 8A:
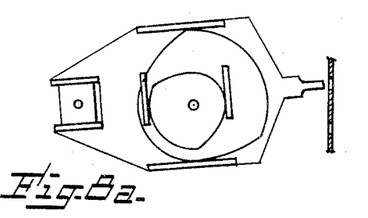
Figs. 8a-8h are schematic diagrams illustrating the cam positions a—h represented in Fig. 7.
Figure 8B:
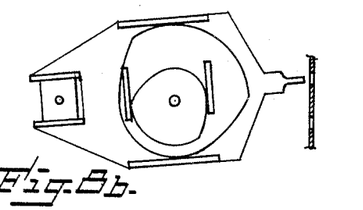
Figure 8C:
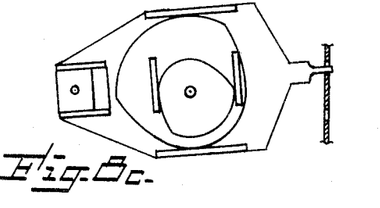
Figure 8D:
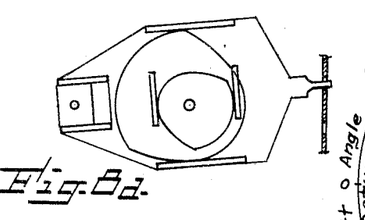
Figure 8E:
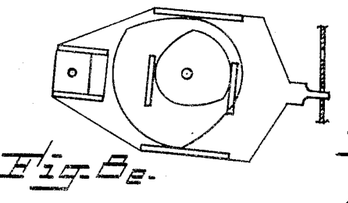
Figure 8F:
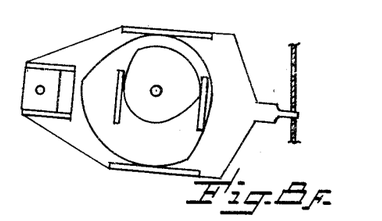
Figure 8G:
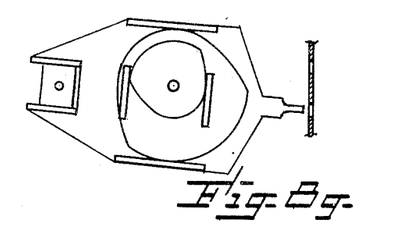
Figure 8H:
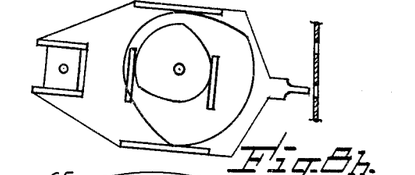

That behavior is illustrated in detail in Figs. 7 and 8a–8h for a movement of the general type shown in Figs. 1–4, but in which both cams have dwell angles of 120°. In Fig. 7 the various stroke and dwell periods of the pull-down and meshing cams are indicated in the outer and inner annular portions respectively of the diagram in terms of the corresponding angles of rotation of the cam shaft, noted around the periphery of the figure. At each point $a, b \ldots h$ of the diagram the positions of the two cams are those indicated in the corresponding one of Figs. 8a, 8b ... 8h. Dashed lines in Fig. 7 connect each of those points with the corresponding position of the claw in the claw pattern ABCD. It will be seen that the claw remains at rest at the point A, say, of its pattern during the time required for the cam shaft to rotate through 30° from position $c$ to position $d$. That is the angular extent of the overlap of the dwell periods of the two cams, that of the pull-down cam extending in this particular instance from cam shaft position $a$ to $d$, and that of the meshing cam from position $c$ to $f$. The claw has similar rest periods at B, C and D, produced by overlapping of dwell periods of the two cams.

By adjusting the effective relative phase of the two cams, which can be done either by shifting their relative azimuths on the cam shaft or by shifting the relative angle of the two sets of cam follower surfaces, the action patterns of the two cams (indicated in the two annular regions of Fig. 7) can be relatively shifted in angle. By such a shift, two opposite rest periods of the claw, for example $ab$ and $ef$, can be shortened and the other two rest periods ($cd$ and $gh$) correspondingly lengthened. In that way one pair of opposite claw rest periods can be eliminated completely. Further shifting of the phase in the same direction then results in rounding those corners of the claw pattern at which rest has been eliminated. The length of the claw rest periods is of course also variable by increasing or decreasing the dwell periods of the cams.

Fig. 7 is plotted in terms of angle of cam rotation relative to the rigid frame of the machine, rather than relative to the cooperating cam followers 56 and 61 on the claw arm (Fig. 1). Those two measures of cam angle are not the same, because of the oscillatory motion of the claw arm and the cam followers mounted on it. For purposes of illustration the amplitude of the claw arm oscillation has been taken as 5° on each side of its mean position. From Fig. 7 or Figs. 8a–8h it will be seen that the claw arm is at its extreme upward or counterclockwise oscillatory position for the claw positions marked a to d, and is in its extreme downward or clockwise position for the claw positions e to h. Hence the angular positions of the cams relative to the followers can be obtained from the cam shaft angles given in Fig. 7 by subtracting 5° for positions a to d and by adding 5° for positions e to f. (For the sake of clarity in Fig. 7, the angle of cam rotation is plotted clockwise to match the clockwise movement of the claw about its motion pattern ABCD. The direction of actual cam rotation to produce that claw pattern is counterclockwise, as is clearly seen from the series of successive positions in Fig. 8 and from arrow 37 in Figs. 1 and 6.)

A preferred embodiment of the present invention in the illustrative movement of Figs. 1–4 is shown somewhat schematically in Fig. 9. The pull-down cam 60a in Fig. 9 has its cam axis 77 located eccentrically with respect to the shaft axis 38. The azimuth of the cam eccentricity in Fig. 9 is such as to place shaft axis 38 on a cam radius (indicated by the dashed arrow 80) drawn from cam axis 77 to the midpoint 81 of outer dwell surface 73 of the cam. Fig. 6 illustrates the same arrangement diagrammatically, the point 82 representing a typical eccentric position of shaft axis 38 which corresponds to the arrangement in Fig. 9. Fig. 6 differs from Fig. 9 in that it represents a cam having a 90° dwell angle, such as forms the basis for Figs. 10–15.

Fig. 6a corresponds to Fig. 6, but illustrates a cam having a dwell angle of 120° (as in Figs. 7 and 8) and which also typically shows how the corners of a constant diameter cam may be rounded without altering the general properties which are involved in the present invention. The various points and lines identified by common numerals in Figs. 6 and 6a have a general significance which is independent of the particular cam angle, and also independent of such details of cam form as rounding of its corners. For example, the throw surface 72, which in Fig. 6 is circular with its center at 89, is in Fig. 6a composed of two circular surface portions centered respectively at 92 and 93. Since the functional equivalence of the cam types in Figs. 6 and 6a is well known, it is considered preferable for clarity in the present description and claims to employ terminology relating particularly to the cam form of Fig. 6, with the understanding that the scope of the invention includes such modifications of cam form as are shown in Fig. 6a.

For the sake of definiteness and clarity in the figures and in the following discussion, the mechanism is considered to be so oriented that the film is advanced along a vertical guideway, and usually in a downward direction. It is to be understood that such terms as "vertical" and "downward" are here used with reference to that typical arrangement, and not as limiting the scope of the invention.

Figure 10:
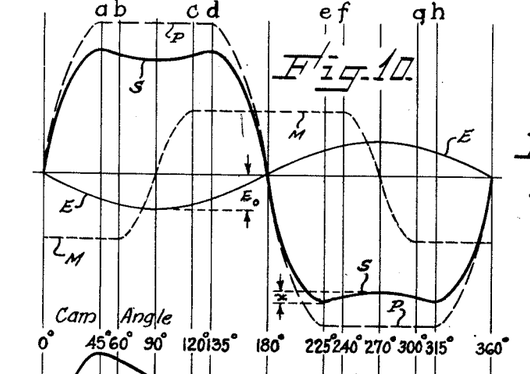
Figs. 10-12 are graphs illustrating the cam action in three typical modifications of the invention, the dwell periods of the meshing and pull down cams being 120° and 90°, respectively, and Fig. 10 corresponding generally to the illustrative embodiment of Fig. 9.
Figure 13:
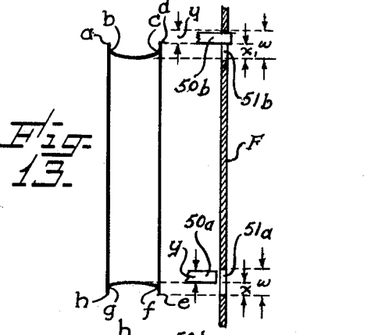
Figs. 13-15 are diagrams representing the claw patterns produced by the three modifications of Figs. 11-13, respectively.

Figs. 10 and 13 illustrate the claw action when the pull-down cam is eccentric in the manner illustrated in Fig. 9 and indicated by the points 82 in Figs. 6 and 6a.

Figure 11:
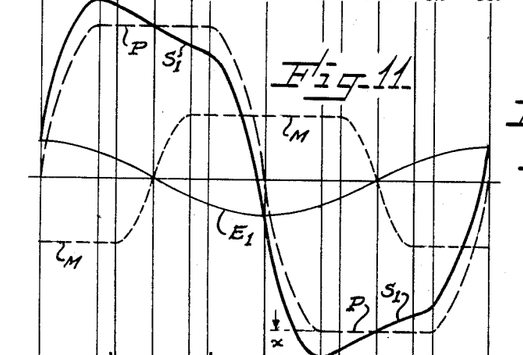
Figure 12:
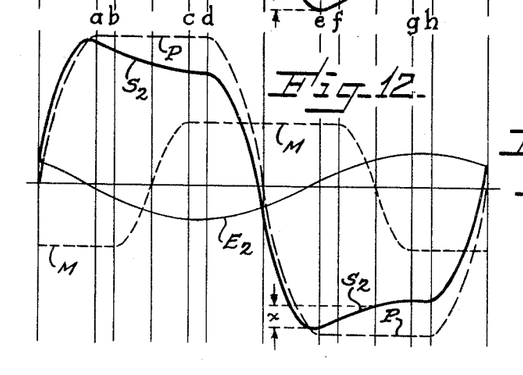
Figure 14:
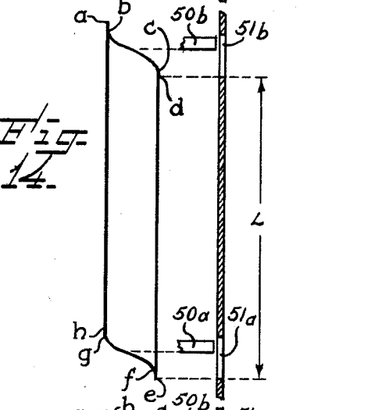
Figure 15:
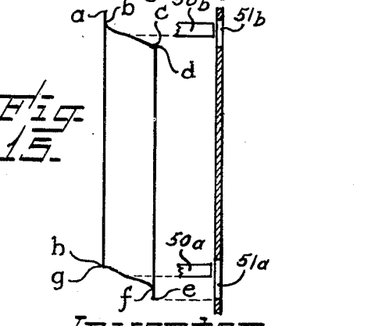

Figs. 11 and 14 similarly illustrate the result obtainable from another azimuth of eccentricity, typically represented by points 83 in Figs. 6 and 6a; and Figs. 12 and 15 show the result obtainable from a third illustrative value of the azimuth, typically represented by points 84 in Figs. 6 and 6a.

In each of Figs. 10–12 the dashed curve P is a plot of the claw motion longitudinal of the film, produced by the action of a pull-down cam, such as the one described, when it is mounted concentrically on its shaft. The curve M, drawn with shorter dashes, represents the claw motion transverse of the film, produced for example by action of a meshing cam such as the one described. This curve is included merely for reference, to show clearly how the pull-down motion is typically correlated with the meshing motion. Both longitudinal and transverse components of the claw motion are plotted vertically at independent and arbitrary scales. With respect to curve M, motion of the claw toward film engagement is plotted upward in the graphs; with respect to curve P and similar curves, longitudinal claw motion in the direction of normal film advancement is plotted downward in the graphs. The horizontal axis represents cam angle, measured with respect to the cam followers on the claw arm (not measured with respect to a fixed reference frame, as in Fig. 7; see above).

The meshing action represented in Figs. 10–12 is based on a meshing cam having a dwell angle of 120°, as in Fig. 7, for example. However, the pull-down motion is here illustratively based on a pull-down cam having a smaller dwell angle of 90°. The figures thus show clearly that the form of the two cams need not be the same. In Figs. 10–12 the cam angles which correspond to the various cam positions shown in Figs. 7 and 8a–8h are indicated by the vertical lines marked a, b . . . h. The differences in spacing between those lines and the corresponding circularly plotted intervals in Fig. 7 are due partly to the different dwell angle of the pull-down cam and partly to the different frame of reference for the angles, as explained above.

When the pull-down cam is set eccentrically on its shaft, an eccentric effect is added to the normal cam effect (curve P), the sum of those two effects then determining, either primarily or completely, the longitudinal claw motion. That eccentric effect is schematically represented by the light solid line E in Fig. 10 for an arrangement in which the cam shaft axis 38 is displaced from cam axis 77 toward the midpoint 81 of the outer dwell surface of the cam. As shown by curve E, the effect of such eccentricity upon the claw motion can be represented by a "sine" curve the phase of which is just opposite to that of the normal cam action P of the pull-down cam. The sum of the curves P and E is shown in Fig. 10 by the heavy solid line S, which therefore represents the actual claw motion longitudinally of the film in accordance with this particular modification of the invention.

The resulting two-dimensional claw pattern is represented in Fig. 13, in which motion longitudinally of the film is represented vertically and meshing motion is represented horizontally, motion to the right giving film engagement and that to the left giving film disengagement. Figs. 13–15 are diagrammatic in that the claw strokes *de* and *ha* are shown straight, whereas with the particular movement shown in Figs. 1–4 (but not with all movements) the actual claw strokes are curved (Fig. 5). The main film advancing stroke is the portion of the pattern between *d* and *e* (compare curve P of Fig. 10). After reaching the end of the pull-down stroke at *e*, the claw moves back along the same path to *f*. The distance of that reverse movement corresponds to the vertical displacement of curve S in Fig. 10 during the period between *e* and *f*, which, for a centered cam, would be a period of claw dwell (Fig. 7). With the present eccentric cam, however, that period *ef* is a dwell period only insofar as direct cam action is concerned; it does not lead to complete claw rest because of the eccentric effect (curve E.) Immediately following *ef*, the upward claw motion continues, due to the eccentric effect, and the meshing cam starts the unmeshing stroke (section *fg* of curve M). At the midpoint of that stroke, the eccentric effect reaches its upward limit and turns downward, producing a downward trend in the claw path as the unmeshing stroke is completed, and also during the ensuing "dwell" period *gh*. That downward eccentric motion continues during the entire return stroke *ha* of the claw, but is masked by the far greater upward motion produced by the return stroke of the pull-down cam.

With the arrangement here described, the claw motion at the meshing stroke end of the claw pattern is symmetrically identical with that at the unmeshing stroke end, as is apparent from Figs. 10 and 13 without further detailed description.

The important practical result of a claw pattern such as that in Fig. 13 is that after the film advancing stroke *de*, the claw is moved in reverse longitudinal direction (upward) along *ef* out of contact with the edge of the film perforation before the start of the unmeshing stroke *fg*. Hence the latter stroke cannot produce any scraping of the claw against the film edge.

A further advantage of the particular pattern in Fig. 13 is that if the direction of intermittent advancement of the film is reversed by reversing the direction of rotation of the cam shaft, the same favorable type of action takes place. The claw path then retains the shape shown in Fig. 13, but is traversed in a counterclockwise direction. The film advancing stroke is then the upward stroke *ed*. That stroke is followed by the reverse (downward) motion of the claw from *d* to *c*, which disengages the claw from the film edge so that the unmeshing stroke *cb* cannot injure or disturb the film.

When a movement having a claw pattern of the general type shown in Fig. 13 is reversed, not only is the improved unmeshing action retained, but the framing of the film can be made more nearly the same for the forward and reverse motions than with conventional claw movements. At the end of a reversed (upward) claw stroke *ed*, the film is left with the upper edge of the perforation in actual contact with the upper claw face at claw position *d*. That film rest position differs from the rest position for forward film motion by an amount which equals the clearance shown in Fig. 13 between claw 50*b* and the upper edge of perforation 51*b*.

That clearance can in practice be made very small, since the claw moves parallel to the plane of the film as it approaches, and also as it leaves position *d*. In previous claw movements, in which the claw approaches the point at the top of the normal film advancing stroke in a direction transverse of the film, a more substantial clearance must be provided to prevent possibility of actual contact with the upper perforation edge during the meshing action. Upon reversal of such a movement, there is an appreciable framing error, often requiring correction by manual framing adjustment. By reducing that error to negligible proportions, the present invention, in the form just described, dispenses with the need of adjusting the framing when the direction of film motion is reversed.

Returning now to the normal direction of cam rotation, it will be understood that the vertical width of the claw must be somewhat less than that of the film perforations which it is to engage, in order to accommodate the slight vertical claw motion which takes place before and after the pull-down stroke proper. This is illustrated in Fig. 13 (and similarly in Figs. 14 and 15) by a schematic showing of a film F, displaced an arbitrary distance to the right of the claw path, but in a vertical position with respect to that path which corresponds to the rest position of a film between pull-down strokes. For clarity in this correlation, it is assumed that the claw path in the figure represents the path of the film contacting point on the lower edge or face of the claw. Thus the film comes to rest after a pull-down stroke with the lower edge of perforation 51*a* at the level of the point *e*, which is the point of furthest advance of the claw. This relationship is indicated in Fig. 13 by the horizontal dashed line extending from point *e* of the claw path to the lower edge of film perforation 51*a*.

As already explained, after completion of the pull-down stroke *de* the claw is lifted free of the film along *ef* and is then withdrawn from the perforation along the path *fg*. The end of the claw may not be fully withdrawn from the film until near the end of unmeshing stroke *fg*, but for purposes of illustration it may be supposed that the claw leaves the film at the midpoint of that stroke (and, correspondingly, that the claw end enters film perforation 51*b* at the midpoint of the meshing stroke *bc*). When that is true, the claw position as it leaves perforation 51*a* will be as illustrated at 50*a*, with the lower edge of the claw at the level of the midpoint of unmeshing stroke *fg*. That level is higher than point *e*, due to the cam eccentricity, by a distance indicated in Figs. 10 and 13 as *x*. In order to avoid interference between the upper edge of claw 50*a* and the upper edge of perforation 51*a* as the claw is withdrawn, the vertical claw width *y* must be no greater, and preferably slightly less, than $w-x$, where *w* is the vertical width of the perforation.

A similar relation holds with regard to entrance of the claw into a succeeding perforation 51*b*. The claw enters that perforation at the level of the horizontal dashed line drawn from the midpoint of meshing stroke *bc*, and subsequently is lifted by the eccentric effect through a vertical distance $x_1$ to the position indicated at 50*b*. Since the claw must clear the lower perforation edge as it enters and must clear the upper perforation edge at the upper extreme *d* of its motion, the claw width *y* must again be less than $w$—$x_1$. Due to the symmetry of the claw path here illustrated, $x_1$ is equal to $x$.

In general, the eccentric effect in accordance with the invention must be taken into account in determining those dimensions of the mechanism which control the effective length of the pull-down stroke. The required stroke length is of course determined by the film frame interval, or the spacing along the film of successively engaged perforations, such as 51a and 51b. That distance is indicated in Fig. 14 by the letter L (omitted from Fig. 13 for clarity). In the modification of the invention shown in Figs. 9, 10 and 13, the maximum effective length of the film advancing stroke is represented by the vertical distance from the midpoint of meshing stroke bc to the lowest point e of pull-down stroke de. That stroke distance must be equal to, or preferably slightly greater than, the frame distance L. As will be seen at once from Fig. 10, that stroke distance is quite different from (and, in the present instance, is less than) the claw stroke which the movement would have if the cam were centered (curve P). While it is thus necessary to take the eccentric effect into account in the overall design of the movement, in order to obtain the requisite effective stroke length for a particular type of film, in practice the cam eccentricity can be, and preferably is, so small that the dynamics of the movement are scarcely affected. For example, in the modification just described, the distance of direct claw lift ef need be only about 0.002" to free the claw from the film with certainty before the start of the unmeshing stroke. To produce that amount of lift within the corresponding range of cam angle between e and f, the amplitude $E_0$ of the eccentric effect at the claw must satisfy the equation:

$$E_0(\sin 240° - \sin 225°) = 0.002''$$

This leads to a value of E of about 0.012", which is small compared to an effective stroke amplitude L/2 of 0.375" for 35 mm. film or of 0.150" for 16 mm. film. As already pointed out, the amplitude of the eccentricity is exaggerated in the figures for clarity of illustration.

In the modification just described, the main pull-down stroke starts with the claw in the position 50b in Fig. 13, spaced above the lower edge of film perforation 51b. Hence actual contact of the claw with the film edge occurs only after the claw has acquired a finite velocity. In practice the distance $x_1$ is only a few thousandths of an inch, so that the velocity of the claw at film contact is correspondingly small and ordinarily requires no special consideration. However, under certain conditions the initial acceleration of the film may be more abrupt than is desirable.

The potential disadvantage just described can be either reduced or wholly avoided by appropriate selection of the azimuth of eccentricity of the pull-down cam. Figs. 11 and 14 illustrate typical action when the azimuth of eccentricity is such that the shaft axis lies on a cam radius which bisects the angle subtended by inward stroke surface 74 of the cam, for example at point 83 in Figs. 6 and 6a. Fig. 11 differs from Fig. 10 in that the curve of eccentric effect $E_1$ is shifted horizontally to the right through 90°, producing a correspondingly altered curve $S_1$, which is the sum of $E_1$ and P. The eccentric effect now reverses its direction at the midpoint of the pull-down stroke de (and also at the midpoint of the return stroke ha). Hence the claw is lifted off the film at the end of the pull-down stroke during the period of relative dwell ef (as before); but is lowered into contact with the film at the start of the pull-down stroke during the similar dwell period cd. Contact between the claw and the film, with this arrangement, preferably occurs at or immediately below point d in the claw pattern of Fig. 14, at which point the claw is moving in the plane of the film at a relatively slow velocity, produced wholly, or substantially wholly, by the eccentric effect. The actual film engagement is thus more gentle and smooth than when it occurs after the claw velocity has been increased appreciably by the more vigorous action of the pull-down cam. In this connection, it should be remembered that the distances cd and ef, and hence also the corresponding claw velocities, can in normal practice be made very small and yet be effective for the purposes of the invention.

In the modification illustrated in Figs. 12 and 15, the cam shaft axis lies just within the angle of the outer dwell surface 73 of the pull-down cam, close to the cam diameter 76 which divides that surface from inward throw surface 74. Corresponding points in Figs. 6 and 6a are marked at 84. The eccentric effect here reverses its direction at the midpoint of the (cam) dwell period cd immediately preceding the pull-down stroke, as shown clearly in Fig. 12. The points c and d therefore coincide in the pattern (Fig. 15), the claw being substantially at rest during the period cd. The eccentric effect is substantially zero during that period because the eccentric is passing through dead center. On the other hand during the (cam) dwell period ef following the pull-down stroke, the eccentric effect is close to a velocity maximum, so that (for given amplitude of eccentricity) the points e and f of the pattern are relatively widely separated. The desired effect at the end of the pull-down stroke is thus obtained in the modification of Figs. 12 and 15 with a minimum eccentricity, and involves substantially zero effect during the dwell period at the beginning of that stroke.

The distance ef through which the claw is lifted at the end of the stroke is proportional to the amplitude of eccentricity of the cam axis with respect to the cam shaft axis (other factors remaining constant). It also depends upon the azimuth of that eccentricity. The latter dependence can be approximately expressed by saying that the claw lift is proportional to the distance of the shaft axis 38 (represented by the points 82, 83 and 84 in Figs. 6 and 6a for the three typical modifications described above) from the plane through cam axis 77 and the leading edge 86 of the outer cam dwell surface 73 (also through the leading edge 87 of inner cam dwell surface 71. In Figs. 6 and 6a that plane is normal to the plane of the paper, which it intersects along cam diameter 75. The direction of claw motion in the path interval ef is generally opposite to its motion during pull-down stroke de whenever shaft axis 38 lies on the same side of that plane as outer dwell surface 73. The reason for that is that dwell surface 73 then becomes eccentric with respect to the shaft axis in such a sense that its leading edge 86 is farther from the shaft axis than adjacent points of either dwell surface 73 or stroke surface 72. In other words, the length of a radius drawn from the shaft axis to a surface point then passes through a maximum as the surface point moves across the edge 86 between outward stroke surface 72 and outer dwell surface 73. Similarly, the length of a radius passes through a minimum as the surface point moves across the "edge" 87 between inward stroke surface 74 and inner dwell surface 71. Thus, whether the claw motion is considered to be derived from one cam follower surface or the other, that motion reaches an extreme value and reverses its direction at the end of the pull-down stroke as the point of cam contact with the cam follower moves from stroke surface to dwell surface. Thus the desired claw lifting action can be obtained with the shaft axis at any position within the 180° angle about cam axis 77 denoted in Figs. 6 and 6a by the dashed arrows 90.

For shaft axis positions on the opposite side of the above defined plane from outer dwell surface 73, the claw motion induced by the eccentricity immediately following the pull-down stroke is in the same direction as that stroke, and does not serve to lift the claw free of the film perforation edge.

At the start of the pull-down stroke a similar analysis applies. The follower surfaces shift their points of cam contact across the respective boundaries 88 and 89 from the trailing portions of the respective dwell surfaces 71 and 73 to the leading portions of the stroke surfaces 72 and 74. Eccentricity of the cam on its shaft results in a claw movement, just prior to the pull-down stroke, which is approximately proportional to the distance of the shaft axis from the plane through the cam axis and the trailing edges of the dwell surfaces. In Figs. 6 and 6a that plane intersects the paper in cam diameter 76. The resulting claw movement is in the same direction as the subsequent pull-down stroke (and thus acts to bring the claw smoothly into film engagement) whenever the shaft axis is displaced from the defined plane on the same side as inner dwell surface 71; that is, when the shaft axis lies within the 180° angle indicated by the dashed arrow 91. Shaft axis positions outside of that angle give opposite claw movement. Positions very near cam diameter 76 give substantially zero claw movement longitudinal of the film just previous to the pull-down stroke.

The preceding analysis will be seen to be in agreement with the illustrative claw paths resulting from the three typical modifications already described. Thus the claw path in Fig. 15, corresponding to shaft axis position 84, close to cam diameter 76 and relatively far from diameter 75, gives substantially zero eccentric effect at the start of the pull-down stroke (points $c$ and $d$ coinciding) and gives a maximum effect at the end of that stroke (points $e$ and $f$ relatively widely spaced). Shaft position 84, within angle 90 and also within angle 91, leads to a downward claw motion at the start of the pull-down stroke and an approximately equal upward motion at its end (Fig. 14). Shaft position 82, lying within angle 90 but outside angle 91, leads to the desired upward claw movement at the end of the pull-down stroke, and also an upward movement at its start (Fig. 13).

By suitable selection of the azimuth of eccentricity, the ratio of the claw displacement during period $cd$ to that during $ef$ can be given any desired value. In Figs. 10 and 13 (shaft axis at 82 in Figs. 6 and 6a) that ratio is $+1$; in Figs. 11 and 14 (shaft axis at 83) it is $-1$, and in Figs. 12 and 15 (shaft axis at 84) it is 0. By varying the position of the shaft axis from 84 toward point 82, values of the above defined ratio from 0 to $+1$ are obtained, while positions between 84 and 83 lead to values of the ratio between 0 and $-1$. Values of the ratio progressively greater than $+1$ and less than $-1$ are obtained when the shaft axis is moved respectively beyond point 82 in a counterclockwise direction and beyond point 83 in a clockwise direction, as seen in Figs. 6 and 6a.

In connection with the three modifications illustrated in Figs. 10–15, it will be noted that the three respective positions of the cam shaft axis with respect to the cam, indicated in Figs. 6 and 6a by the points 82, 83 and 84, may be characterized in the following way. All those points lie to the right of cam diameter 75 (in Figs. 6 and 6a). In other words, all those shaft positions lie on the same side as dwell surface 73 of the plane defined by cam axis 77 and the leading edge 86 of that dwell surface. For any such shaft position the eccentric effect acts during the claw "dwell" following the pull-down stroke to move the claw in a direction opposite to that stroke. That effect is the more pronounced the farther the shaft axis lies from the plane just defined. Point 82 lies in a plane through cam axis 77 and midpoint 81 of dwell surface 73. Point 83 is typical of points lying within the angle subtended by inward throw surface 74, that angle being directly opposite the angle subtended by outward throw surface 72. And point 84 lies close to cam diameter 76 within an angle subtended by the trailing portion of dwell surface 73.

The quantitative distinction between the three modifications discussed above will be clarified by typical figures. If it is required, for example, that the upward claw motion during period $ef$ be 0.002", which gives adequate clearance between the claw and the film edge under typical conditions, the eccentric effect at the claw (curve E) must have an amplitude $E_0$ (Fig. 10) of about 0.012" in the modification of Figs. 10 and 13 (as explained above); of about 0.010" in that of Figs. 11 and 14; and of about 0.008" in that of Figs. 12 and 15. If the cam shaft is midway between pivot axis 43 and the plane of the film (Fig. 1) the required eccentricity of the cam itself is equal to about half the amplitude of the eccentric effect at the claw, because of the lever effect of the claw arm.

The effective length of the pull-down stroke is affected (in general) by such cam eccentricity, and the design of a movement to handle film of a particular type must take account of both the amplitude and the azimuth of the contemplated cam eccentricity. The above detailed discussion of this effect for the modification of Figs. 9, 10 and 13 applies, with obvious modifications of detail, in the case of the embodiments represented by Figs. 12, 14 and 13, 15. It is therefore not in general feasible to vary the eccentricity either in magnitude or in azimuth without making compensating changes in the mechanism which will preserve the required effective stroke length. On the other hand, the eccentricity can be freely shifted between two specific positions, which may differ in azimuth or in magnitude, or in both, so long as the effective length of the pull-down stroke is substantially the same for those two positions. For example, the pattern of Fig. 15 can be produced as described during cam rotation in the normal direction. Upon reversal of the direction of cam rotation, to move the film intermittently in a reversed direction, the claw pattern can be effectively turned upside down by shifting the azimuth of eccentricity to a position which is symmetrical with respect to the cam axis of symmetry (for instance, by shifting the shaft axis position 84 to 84a in Figs. 6 and 6a). Such a change, accompanied by reversal of direction of rotation, will not disturb the effective stroke length.

With any arrangement using constant diameter cams, the claw pattern has symmetry of the type shown by Figs. 14 and 15, so long as all secondary effects, due to claw arm mounting and the like, are disregarded.

The modifications which result, in the typical patterns of Figs. 13–15, when the phase angle between the two cams is altered will be obvious from the above description. The periods of relative claw dwell *ef* and *ab*, for example, can be lengthened in that way, periods *cd* and *gh* being correspondingly reduced, or even eliminated. By lengthening period *ef*, either in that way or by using cams having longer dwell periods, a given claw motion during that period can be obtained with a smaller cam eccentricity. Of course, all the dwell periods may be generally lengthened or shortened by using cams (or either cam) with longer or shorter dwell angles.

Even in a movement which does not have any overlap between the dwell periods of the two cams, so that all four periods *ab*, *cd*, *ef* and *gh* are absent, the present invention has utility, since it then provides a convenient means of modifying the direction of the meshing and, particularly, the unmeshing strokes. Under such conditions, for example, a pattern can be obtained having the general form of Fig. 14, but without the portions *ab* and *ef*. The claw then approaches and leaves the film edge obliquely at a relatively steep angle, minimizing any tendency toward scraping action which might otherwise result.

It is not intended that details of the particular type of movement described above, or of the illustrative embodiments of the invention selected for description, be interpreted as limiting the scope of the invention; which scope is expressed in the following claims.

I claim:

1. A mechanical movement comprising a constant diameter peripheral cam, the cam periphery being composed of circular cam surfaces two of which have different radii and a common center of curvature, the cam being mounted for rotation about an axis eccentric with respect to the two said mutually concentric cam surfaces, and a pair of cam follower surfaces engaging opposite cam faces of the cam.

2. An intermittent film movement of the claw type comprising a film engaging claw, a claw actuating member, and cam means for driving said member; said cam means including a constant diameter peripheral cam having its cam periphery composed of circular cam surfaces two of which have different radii and a common center of curvature, and a pair of cam follower surfaces engaging opposite cam faces of the cam and operatively connected with the claw actuating member, the cam being mounted for rotation about an axis eccentric with respect to the two said mutually concentric cam surfaces.

3. In an intermittent movement of the type which comprises a film guideway, a claw adapted to engage a film in the guideway, means for moving the claw intermittently longitudinally of the film in alternately directed strokes separated by periods of relative claw dwell, said means including a cam shaft rotatable about a shaft axis, means for driving the cam shaft in a predetermined normal operating direction, a constant width cam mounted on the shaft for rotation therewith and having a cam axis, two oppositely disposed circular dwell surfaces on the cam concentric with respect to the cam axis and having different radii, an outward stroke surface on the cam extending from the trailing edge of the dwell surface of smaller radius to the leading edge of the dwell surface of larger radius, an inward stroke surface on the cam extending from the trailing edge of the dwell surface of larger radius to the leading edge of the dwell surface of smaller radius, a primary cam follower surface operatively associated with the claw and arranged to engage the said cam surfaces successively upon cam rotation, a secondary cam follower surface in parallel spaced opposition to the primary cam follower surface and adapted to engage the cam surface opposite thereto, and means operated in timed relation to the shaft rotation for moving the claw transversely of the film into and out of film engagement during periods of engagement of the primary follower surface with the cam dwell surfaces of smaller and of larger radius, respectively; the improvement characterized by the fact that the cam is mounted on the cam shaft with the cam axis eccentric with respect to the shaft axis, the azimuth of eccentricity of the said axes being such that the shaft axis and the cam dwell surface of larger radius lie on the same side of the plane defined by the cam axis and the leading edge of the last mentioned dwell surface.

4. The improvement in intermittent movements defined in claim 3, and in which the azimuth of eccentricity of the said axes is such that the shaft axis lies within the angle about the cam axis which is directly opposite to the angle subtended by the said outward stroke surface.

5. The improvement in intermittent movements defined in claim 3, and in which the shaft axis lies approximately in a plane through the cam axis bisecting the said dwell surface of larger radius.

6. The improvement in intermittent movements defined in claim 3, and in which the shaft axis lies within an angle about the cam axis subtended by that portion of the dwell surface of larger radius adjacent its trailing edge.

7. In an intermittent movement of the type which comprises, a frame, a film guideway, a claw arm movably mounted on the frame for oscillation longitudinally of the guideway, a claw mounted on the claw arm and adapted to engage a film in the guideway, a cam shaft journaled on the frame for rotation about a shaft axis, a cam mounted on the cam shaft for rotation therewith, said cam having a cam axis and a cam surface comprising portions alternately concentric and eccentric with respect to the cam axis, a cam follower on the claw arm arranged upon rotation of the cam to engage the cam surface and thereby to move the claw in a cyclic pattern of motion longitudinally of the film guideway, said pattern including alternately directed claw strokes alternating with periods of relative claw dwell, and means for moving the claw periodically transversely of the film in timed relation to the said longitudinal motion to maintain the claw in film engagement during claw strokes in one direction and out of film engagement during claw strokes in the other direction; the improvement characterized by the fact that the cam is mounted on the shaft with the cam axis eccentric with respect to the shaft axis, the azimuth of eccentricity of said axes being such that, during those said periods of relative claw dwell which follow claw strokes in the said one direction, the claw is moved longitudinally of the film in the opposite direction.

GEORGE A. MITCHELL.

REFERENCES CITED

The following references are of record in the file of this patent:

UNITED STATES PATENTS

| Number | Name | Date |
|---|---|---|
| 1,609,268 | Gossett | Nov. 30, 1926 |
| 1,900,876 | Wittel | Mar. 7, 1933 |
| 1,914,398 | Bornmann | June 20, 1933 |
| 2,076,919 | Ross | Apr. 13, 1937 |
| 2,124,167 | Montgomery | July 19, 1938 |
| 2,267,409 | Massini | Dec. 23, 1941 |
| 2,448,519 | Clapp | Sept. 7, 1948 |
| 2,475,622 | Kuehn | July 12, 1949 |
| 2,481,706 | Wittel | Sept. 13, 1949 |
| 2,484,348 | Kellogg et al. | Oct. 11, 1949 |

FOREIGN PATENTS

| Number | Country | Date |
|---|---|---|
| 727,898 | France | Apr. 4, 1932 |
| 386,042 | Great Britain | Jan. 12, 1933 |